THEODORE B. TREMPER.
Improvement in Car Coupling.
No. 121,690. Patented Dec. 5, 1871.
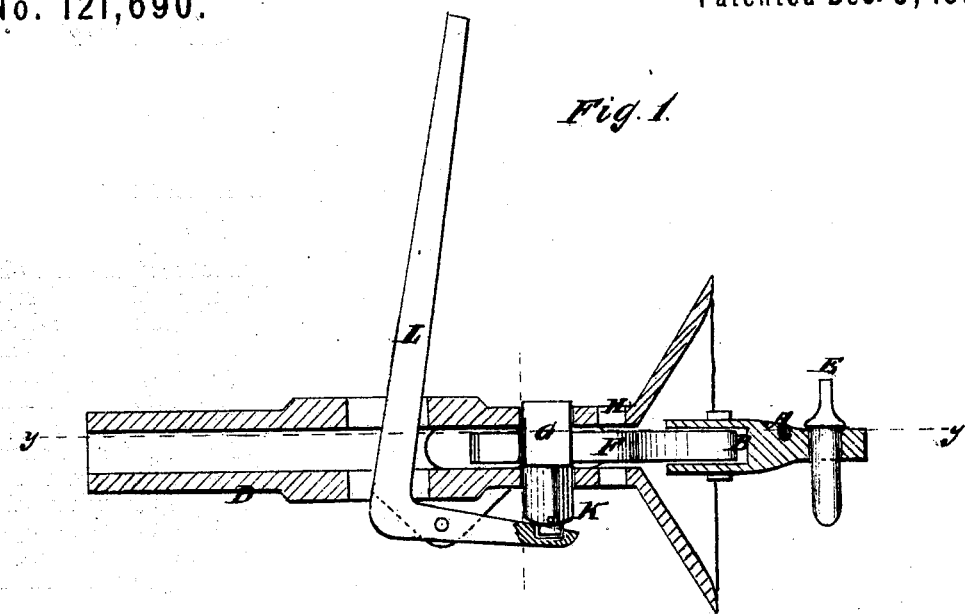
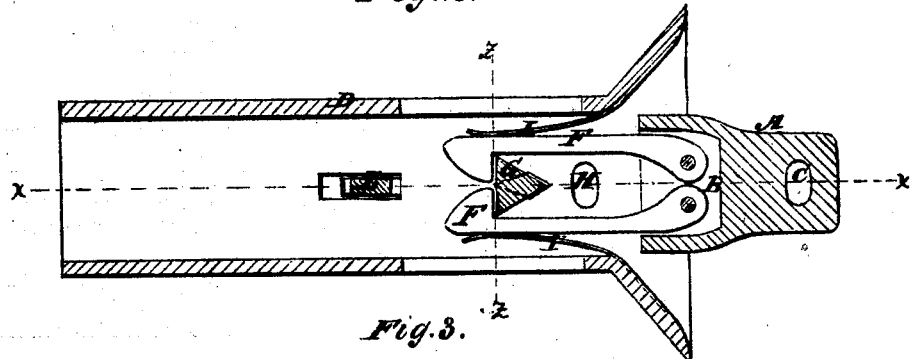
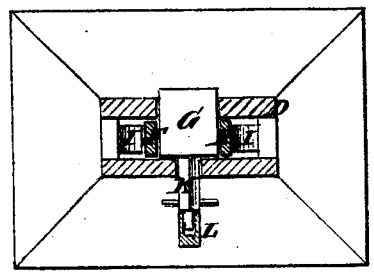

UNITED STATES PATENT OFFICE.

THEODORE B. TREMPER, OF ROCKLAND LAKE, NEW YORK.

IMPROVEMENT IN CAR-COUPLINGS.

Specification forming part of Letters Patent No. 121,690, dated December 5, 1871.

*To all whom it may concern:*

Be it known that I, THEODORE B. TREMPER, of Rockland Lake, in the county of Rockland and State of New York, have invented a new and useful Improvement in Car-Coupling; and I do hereby declare that the following is a full, clear, and exact description thereof, which will enable others skilled in the art to make and use the same, reference being had to the accompanying drawing forming part of this specification.

My invention consists of a pair of hooks pivoted in a socketed connecting-bar, adapted for connecting with the ordinary socketed draw-head by the ordinary connecting-pin, to be used in one draw-head and couple with a vertical triangular pin in the other head behind the place where the common pin is, which triangular pin opens the hooks when they are pushed in, and they are closed behind it by springs. The said triangular pin has a triangular or wedge-shaped part below that which opens the hook, with its apex arranged to open the hooks and uncouple the cars while exposed to the draft, when said pin is raised up so that said part comes between them, and an elbow-lever is provided in connection with said pin for so raising it.

Figure 1 is a longitudinal sectional elevation of my improved car-coupling taken on the line $x$ $x$ of Fig. 2. Fig. 2 is a horizontal section taken on the line $y$ $y$ of Fig. 1, and Fig. 3 is a transverse section on the line $z$ $z$ of Fig. 2.

A is a short connecting-bar, with a socket, B, in one end and a hole, C, through the other, the latter for connecting it with the ordinary draw-head D by the ordinary coupling-pin E. The socket B in the end receives the draw-hooks F at one end; said hooks being pivoted in it, as shown. G is a coupling-pin of triangular form, placed behind the hole H for the ordinary pin, with the apex fronting the mouth of the draw-head to open the hooks when forced in. I represents springs for closing the hooks behind said pin when they have passed in far enough. This coupling-pin has a triangular stem, K, extending downward from the lower end through the draw-head with its apex on the side opposite to that of the upper part, so that when said part is raised up to the hooks they will be opened by it and allowed to escape. L is an elbow-lever with its short arm engaged with the lower end of the coupling-pin under the draw-head, while the long arm extends up through the draw-head, suitably for manipulating it to lift the coupling-pin.

These simple and cheap coupling contrivances being combined with the ordinary buffer-heads afford a suitable means of self-coupling, also un-coupling, while the cars are in motion.

The socketed bar A is so fitted in the socket of the draw-head and the hooks fitted in its socket that they will be held up ready to enter the buffer when the cars come together.

Having thus described my invention, I claim as new and desire to secure by Letters Patent—

1. The combination, with the draw-heads D, of the socketed connecting-bar A, hooks F, springs I, and the triangular coupling-pin G, substantially as specified.

2. The said coupling-pin G, having the triangular extension K arranged as described, and the elbow-lever L combined with the draw-head, substantially as specified.

The above specification of my invention signed by me this 5th day of October, 1871.

THEODORE B. TREMPER.

Witnesses:
GEO. W. MABEE,
T. B. MOSHER.

(122)